US012291207B2

(12) United States Patent
Barrett et al.

(10) Patent No.: US 12,291,207 B2
(45) Date of Patent: May 6, 2025

(54) DRIVER ASSISTANCE FOR HIGH ACCELLERATION AND SPEED ON A MINIMUM TIME PATH

(71) Applicant: Ford Global Technologies, LLC, Dearborn, MI (US)

(72) Inventors: Jordan Barrett, Milford, MI (US); Brendan Francis Diamond, Grosse Pointe, MI (US); Keith Weston, Canton, MI (US); Andrew Denis Lewandowski, Sterling Heights, MI (US); Aaron L. Mills, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 242 days.

(21) Appl. No.: 17/930,077

(22) Filed: Sep. 7, 2022

(65) Prior Publication Data

US 2024/0075930 A1 Mar. 7, 2024

(51) Int. Cl.
*B60W 30/18* (2012.01)
*B60W 10/04* (2006.01)
(Continued)

(52) U.S. Cl.
CPC ...... *B60W 30/18009* (2013.01); *B60W 10/04* (2013.01); *B60W 10/18* (2013.01);
(Continued)

(58) Field of Classification Search
CPC .......... B60W 30/18009; B60W 10/04; B60W 10/18; B60W 10/20; B60W 10/22;
(Continued)

(56) References Cited

U.S. PATENT DOCUMENTS 7,400,963 B2 7/2008 Lee et al.
9,187,097 B2 11/2015 Levin et al.
(Continued)

OTHER PUBLICATIONS

"General Motors Performance Data Recorder Technology," GM Authority, Apr. 11, 2022, 3 pages.

*Primary Examiner* — Anne Marie Antonucci
*Assistant Examiner* — Jodi Jones
(74) *Attorney, Agent, or Firm* — Frank Lollo; Brooks Kushman P.C.

(57) ABSTRACT

A system has memory that stores instructions executable by the processor to instruct operation of at least one vehicle system (e.g., braking system, propulsion system, steering system, suspension system) in a minimum time mode for travel of the vehicle from a starting point to a destination point of a roadway. The system collects roadway data for the roadway from the starting point to the destination point. Based on the roadway data, the system determines a minimum time path from the starting point to the destination point and speed along the minimum time path. In response to a maximum acceleration input from a human driver of the vehicle when the vehicle is at the starting point, the system initiates the minimum time mode and instructs operation of at least one vehicle system to pursue the minimum time path and speed along the minimum time path from starting point to destination point.

19 Claims, 5 Drawing Sheets

(51) Int. Cl.
*B60W 10/18* (2012.01)
*B60W 10/20* (2006.01)
*B60W 10/22* (2006.01)
*B60W 50/14* (2020.01)

(52) U.S. Cl.
CPC ............ *B60W 10/20* (2013.01); *B60W 10/22* (2013.01); *B60W 50/14* (2013.01); *B60W 2420/403* (2013.01); *B60W 2420/408* (2024.01); *B60W 2540/10* (2013.01); *B60W 2552/05* (2020.02)

(58) Field of Classification Search
CPC ........... B60W 50/14; B60W 2420/403; B60W 2420/408; B60W 2540/10; B60W 2552/05; B60W 50/16; B60W 2050/0073; B60W 2050/146; B60W 10/06; B60W 2556/10; B60W 2556/50
USPC ........ 701/70, 54, 1, 51, 41, 36, 93, 23, 301, 701/96, 102, 53, 110, 400, 411, 11, 539, 701/33.8, 30.4, 30.7, 507, 120, 437, 31.1, 701/30.9, 408, 68, 300, 26, 25, 67
See application file for complete search history.

(56) References Cited

U.S. PATENT DOCUMENTS

| | | |
|---|---|---|
| 2015/0203107 A1 | 7/2015 | Lippman |
| 2020/0184849 A1* | 6/2020 | Spence ........... B60W 30/18145 |
| 2021/0261144 A1 | 8/2021 | Kwon et al. |

* cited by examiner

DRIVER ASSISTANCE FOR HIGH ACCELLERATION AND SPEED ON A MINIMUM TIME PATH

BACKGROUND

Vehicles can be operable roadways without governmental speed limits such as raceway, a dragstrip, or private property with an appropriate road. On such roadways, a human driver may seek acceleration and/or speeds that reduce travel time from a starting point to a destination point, e.g., a starting line and a finish line of a dragstrip. As an example, the minimum time from a starting point to a destination point may be desired in competitive racing, e.g., drag strip racing.

DETAILED DESCRIPTION

With reference to the Figures, wherein like numerals indicate like parts throughout the several views, a system 100 of a vehicle 105 includes a computer 110 having a processor and a memory. The system 100 performs a method such as that shown in the process flow 300 of FIG. 3. The memory stores instructions executable by the processor to instruct operation of at least one vehicle system (e.g., a braking system, a propulsion system, a steering system, a suspension system) in a minimum time mode for travel of the vehicle 105 from a starting point 150 to a destination point 155 of a roadway (an example of which being roadway 160 in FIG. 2). The system 100 collects roadway data for the roadway 160 from the starting point 150 to the destination point 155. Based on the roadway data, the system 100 determine a minimum time path (an example shown at 160 in FIG. 2) from the starting point 150 to the destination point 155 and speed along the minimum time path 160. In response to a maximum acceleration input from a human driver of the vehicle 105 when the vehicle 105 is at the starting point 150, the system 100 initiates the minimum time mode and instructs operation of at least one vehicle system to pursue the minimum time path 160 and speed along the minimum time path 160 from the starting point 150 to the destination point 155 in the minimum time mode.

Figure 2:
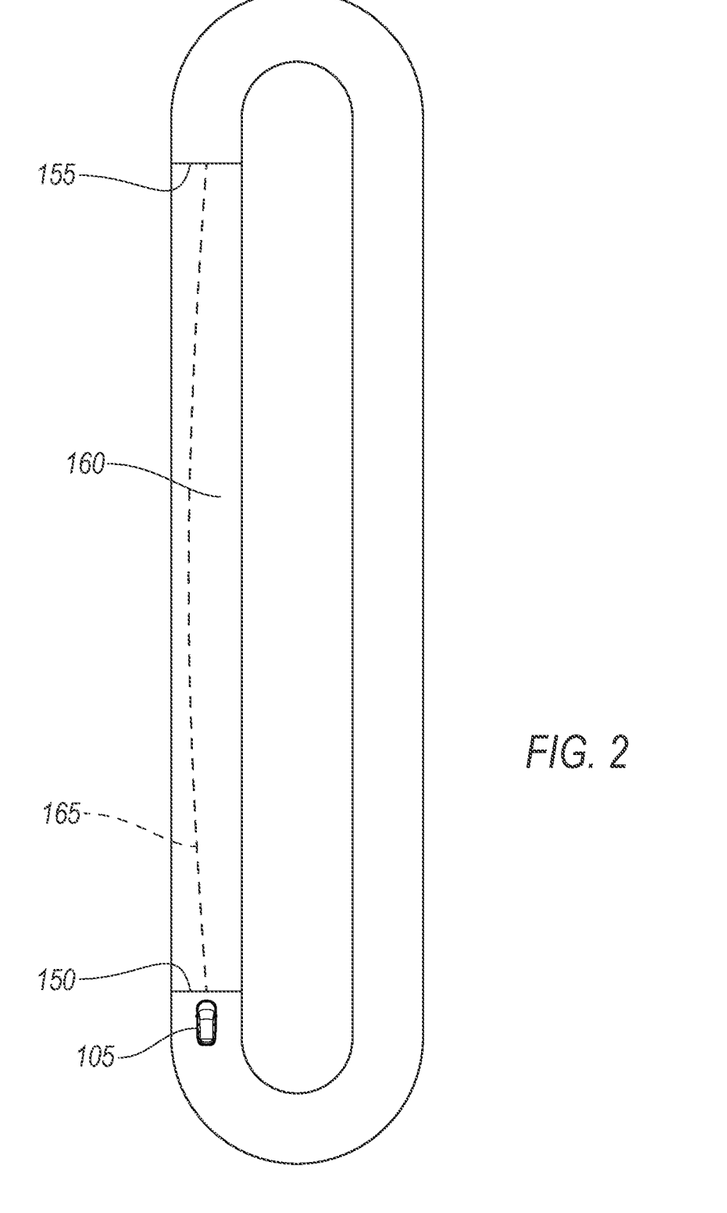
FIG. 2 is a diagram of an example vehicle scene.

The minimum time path 160 in combination with the speed at the points along the minimum time path 160 are determined based on roadway conditions and operation of the vehicle systems to maximize torque transmission to the roadway 160, as described further below. For example, the minimum time path 160 and speed may be determined based on the performance characteristics of vehicle systems (e g., a braking system, a propulsion system, a steering system, a suspension system, etc.) and the systems' ability to operate in a way to maximize torque transmission from wheels of the vehicle 105 to the roadway 160 based on the operation of the vehicle systems in combination with roadway conditions such as condition of the roadway surface, curves in the road, changes in elevation, obstacles, etc. When operating in the minimum time mode, instruction for operation of at least one vehicle system (e.g., driver-assist control commands to the at least one vehicle system and/or a prompt for driver input to at least one vehicle system) is provided to pursue the minimum time path 160 and speed from the starting point 150 to the destination point 155. As an example, the minimum time mode may be used in competitive racing in which the lowest time from the starting point to the destination point is desirable. Specifically, the minimum time mode may assist the human driver during operation of the vehicle at high initial acceleration at the starting point 150 and at high speeds between the starting point 150 and the destination point 155.

Figure 1:
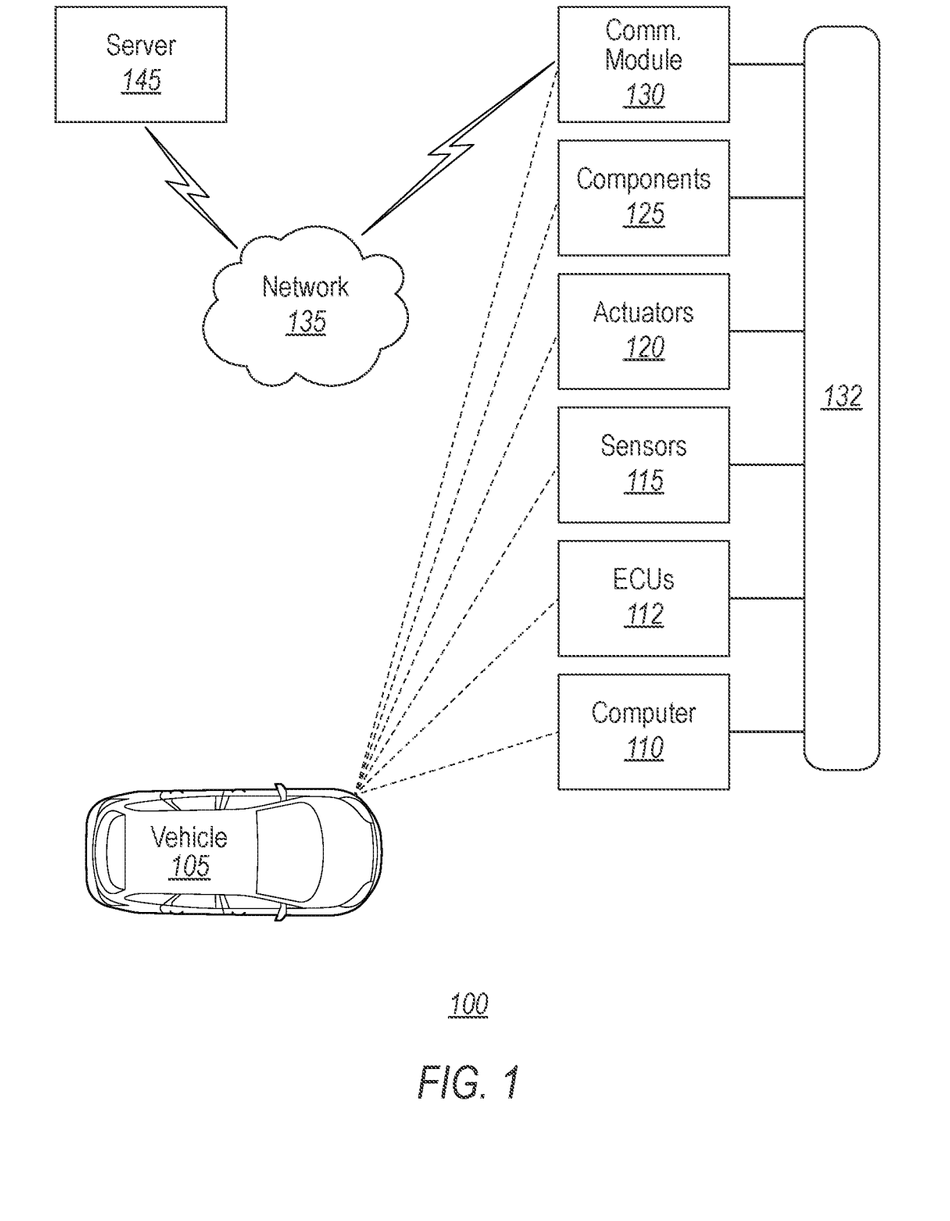
FIG. 1 is a block diagram of an example vehicle system.

FIG. 1 is a block diagram of an example system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135. The vehicle 105 includes a plurality of vehicle systems including known systems such as a braking system, a propulsion system, a steering system, a suspension system, as well as other systems including but not limited to a body control system, a climate control system, a lighting system, and a human-machine interface (HMI) system, which may include an instrument panel and/or infotainment system. The vehicle systems, including the braking system, the propulsion system, the steering system, and the suspension system can each include one or more of the ECUs 112, sensors 115, actuators 120, and components 125.

The propulsion system of the vehicle converts energy to rotation of wheels of the vehicle to propel the vehicle 105 forward and/or backward. The propulsion system may include an engine and/or motors that drive rotation of the wheels of the vehicle. A component 125 of the propulsion system may include an internal combustion engine, an electric-vehicle battery that powers propulsion of the vehicle, or combination, and the ECU 112 and actuators 120 of the propulsion system controls the components 125 of the propulsion system based on input (i.e., a driver-input control command). Examples of electric vehicles include a battery-electric vehicle (BEV), a hybrid-electric vehicle (HEV), a plug-in hybrid electric vehicles (PHEV), etc. In examples in which the vehicle is an electric vehicle, the electric-vehicle battery may be of any suitable type for vehicular electrification, for example, lithium-ion batteries, nickel-metal hydride batteries, lead-acid batteries, ultracapacitors, etc.

The braking system can slow and/or stop movement of the vehicle 105. The human driver may provide input (i.e., a driver-input control command) to the braking system to slow the vehicle. For example, the human driver may depress a brake pedal to actuate components 125 of the braking system (e.g., brake calipers, brake shoes, etc.) and/or to slow a motor of the propulsion system to slow the vehicle. The ECU 112 and actuators 120 of the braking system may control the components 125 of the braking system based on input.

The steering system can control a yaw, e.g., turning left and right, to steer the path traveled by the vehicle when the propulsion system propels the vehicle 105. The steering system may receive input (i.e., a driver-input control command) from a human driver, e.g., through a steering wheel, and turns the steering angle of the wheels of the vehicle to steer the vehicle. Components 125 of the steering system may be mechanical (e.g., including a rack and pinion), electrical (e.g., steer-by-wire), or a combination thereof and the ECU 112 and actuators 120 of the steering system controls the components 125 of the steering system based on input.

The suspension system can control compression and rebound of upward and downward movement of the wheels of the vehicle relative to the body of the vehicle induced by travel of the wheels over uneven driving surfaces, roll forces resulting from turning of the vehicle, pitch forces resulting from braking and acceleration of the vehicle, etc. Components 125 of the suspension system may include active and/or semi-active dampeners between the wheels and the body of the vehicle to electronically control the reaction of the wheels to uneven driving surface, roll forces, pitch forces, etc. ECU 112 and actuators 120 of the propulsion system controls the components 125 of the suspension system based on input.

The computer 110 includes a processor and a memory. The memory includes one or more forms of computer-readable media, and stores instructions executable by the processor for performing various operations, including as disclosed herein. The memory stores instructions executable by the process for performing the example process flow 300, as described below. Specifically, the computer 110 receives input from the human driver, one or more sensors 115, and/or one or more vehicle systems and, based on such input, output instruction for operation in the minimum time mode.

The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

The vehicle 105 includes a plurality of sensors 115 that may support the vehicle control assist or ADAS functions, referred to as ADAS functions for brevity. For example, sensors 115 may include, but are not limited to, one or more wheel speed sensors, GPS sensor, onboard cameras of the vehicle (such as driver-facing camera, back-seat camera, forward-facing camera, side-facing camera, rear-facing camera) ultrasonic parking assist sensor, short range RADAR, medium range RADAR, LiDAR, light sensor, rain sensor, accelerometer, etc. Sensors 115 can support function based on data from a road-based data, e.g., an electronic horizon function, that uses cameras to detect lane lines and road curvature, sometimes in conjunction with detailed mapping data. Sensors 115 may also support a lane keep assist (LCA) function that uses one or more cameras to detect lane lines and a steering position sensor or support a drive assist function that uses one or more cameras to detect lane lines, a steering position sensor, and a driver monitoring system camera (DMSC). Sensors 115 may also support an adaptive cruise control (ACC) function that uses wheel speed sensors/GPS and/or cameras/medium range RADAR/LiDAR to support an automatic follow distance function. Sensors 115 may also support an intelligent adaptive cruise control (iACC) function that uses wheel speed sensors/GPS, cameras, and/or RADAR/LiDAR to support cruise control functions that alter vehicle speed based upon detected speed limits and road curvature. Sensors 115 can support a parking assist function that uses steering sensors, cameras, and/or ultrasonic sensors. Sensors 115 may also include those under control of a body control module (BCM), such as accelerometers, inertial measurement unit sensor that measure the roll and/or pitch of the vehicle.

Actuators 120 are implemented via circuitry, chips, motors, or other electronic and or mechanical components that can actuate various vehicle systems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2I) wireless communications to another vehicle, to (typically via the network 135) a remote server 145 (V2V and V2I may be collectively referred to as V2X). The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) and cellular V2V (CV2V), cellular V2I or V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links, e.g.

Vehicle 105 can include an electrical energy source (such as a battery) and an electric motor that can be powered by the electrical energy source to generate propulsion for vehicle 105. Vehicle 105 can also include an internal combustion engine that also can generate propulsion for vehicle 105. As vehicle 105 travels roadway 160, a power state of the engine can be controlled based on the power demands associated with propulsion of vehicle 105.

Road-based data, e.g., electronic horizon data, is a collection of data as is known obtained from a combination of:

data from the sensors 115 of the vehicle 105: one or more data providers/services; and/or stored map data indicating a current position or location of the vehicle 105 and then predicting a future trajectory of the vehicle 105 with respect to an upcoming portion of roadway 160, e.g., including road geometry, topology, and attributes (e.g., lanes, speed limits, etc.).

In some implementations, vehicle 105 can identify an expected condition change corresponding to a change in roadway curvature. For instance, while vehicle 105 travels a straight portion of roadway 160, vehicle 105 can determine that it is approaching a curved portion of roadway 160. In some implementations, vehicle 105 can identify an expected condition change corresponding to a change in roadway curvature based on road-based data, e.g., electronic horizon data.

In some implementations, vehicle 105 can take information regarding road grade/inclination into account in conjunction with controlling engine power state transitions. In some implementations, vehicle 105 can obtain information regarding road grade/inclination from road-based data, e.g., electronic horizon data, provided by one or more data providers/services. In some implementations, as it travels a given roadway (e.g., roadway 160), vehicle 105 can determine—e.g., based on road-based data such as electronic horizon data—whether the road grade will change at upcoming points along the roadway, and if so, can take such change(s) into account. For instance, vehicle 105 may inhibit a planned engine pull-up or initiate an engine pull-down based (and/or deceleration fuel shut off) on a determination that the road grade will change from a level grade to a downward grade at an upcoming point based and/or based on the minimum time path 160 and speed.

Factors affecting the power demands associated with propulsion of vehicle 105 on the minimum time path 160 can include route/surface metrics, such as road grade, road curvature, road surface friction (mu), rolling resistance, and roadway environmental conditions (e.g., the presence of rain, ice or snow). Factors affecting the power demands associated with propulsion of vehicle 105 can also include factors relating to vehicle load/configuration, such as vehicle weight, tire type, payload, towing of a trailer, and aerodynamic resistance (including the effects of headwinds or tailwinds, if present). Demands for propulsion power can also be affected by maneuvers of vehicle 105 as it travels roadway 301, such as lane changes and accelerations/decelerations to target speed on the minimum time path 160.

Figure 3:
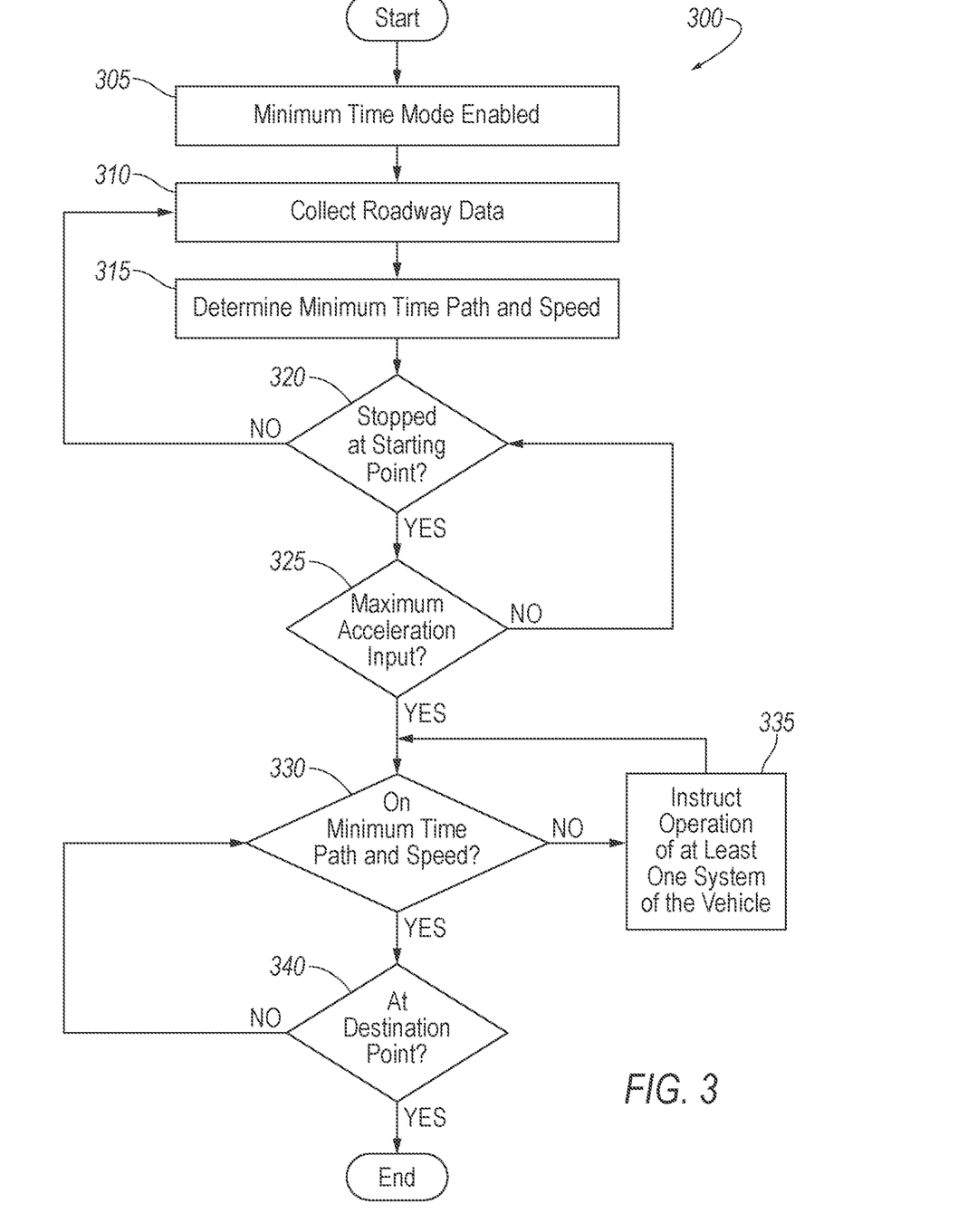
FIG. 3 is a block diagram of an example process flow for the vehicle system.

FIG. 3 is a block diagram of a process flow 300, which may be representative of operations executed in various implementations of the system 100. Process flow 300 is an example method performed by an implementation of the system 100. The process flow 300 includes operation of the vehicle 105 in a minimum time mode to instruct travel of the vehicle 105 from a starting point 150 to a destination point 155 in a minimum time. As an example, the minimum time mode may be enabled by a human driver of the vehicle 105 and the human driver of the vehicle 105 may operate the vehicle 105 in the minimum time mode on raceway, a dragstrip, or private property with an appropriate road. When operating in the minimum time mode, instruction, e.g., instruction to be executed manually by the human driver and/or instruction to be executed automatically by the vehicle 105, is provided for travel of the vehicle 105 from the starting point 150 to the destination point 155 in a minimum time. As an example, the minimum time from a starting point 150 to a destination point 155 may be desired in competitive racing, e.g., drag strip racing. In such examples, the starting point 150 is a starting line and the destination point 155 is a finish line of the race strip. The minimum time mode may be identified to the human driver as "drag strip mode."

In block 305, the process flow includes enabling minimum time mode. The human driver may manually enable the minimum time mode. For example, the human driver may input selection of the minimum time mode to an interface of the vehicle 105, e.g., a selector switch, a human-machine interface, etc.

After the minimum time mode may be enabled in block 405, another input from the human driver may be a prerequisite for initiation of operation in minimum time mode. For example, in the example shown in process flow 300, after enablement of the minimum time mode in block 305, a maximum acceleration input (see block 325) triggers initiation of operation of the vehicle 105 in minimum time mode. The vehicle 105 may remain in and operate in the minimum time mode until the vehicle 105 reaches the destination point 155. Enablement and/or operation in the minimum time mode may be prematurely terminated by the human driver. As an example, the human driver may terminate the minimum time mode by inputting selection terminating the minimum time mode through an interface of the vehicle 105, e.g., a selector switch, a human-machine interface, etc. As another example, the system 100 may automatically terminate enablement and/or operation of the minimum time mode based on predetermined parameters of vehicle operation based on driver-input control commands, e.g., braking frequency and/or magnitude input from the human driver to the braking system, operation of the propulsion system and/or braking system that brings movement of the vehicle below a speed threshold, deviation of vehicle position relative to the minimum time path 160 beyond a threshold, etc.

In block 310, the process flow 300 includes collecting roadway data between the starting point and the destination point. The roadway data may include curves of the roadway 160, changes in elevation of the roadway 160, surface conditions and changes thereof (including water on the roadway 160 such as rain, snow, ice, frost, etc.; road material such as pavement, blacktop, gravel, dirt, sand, etc.; and other conditions that may affect traction), weather conditions including falling precipitation, fog, sun, etc., and obstacles on the roadway 160 such as potholes, loose gravel, etc. The roadway data may be spatially coordinated, e.g., with GPS, such that the system 100 knows the relative position of the vehicle 105 and detected roadway data.

The roadway data may be collected by the vehicle 105 before and/or during travel of the vehicle 105 from the starting point 150 to the destination point 155 in the minimum time mode and/or may be received by the system 100 from external sources, e.g., aggregated data received by vehicle-to-vehicle communication and/or vehicle-to infrastructure communication.

Figure 4:
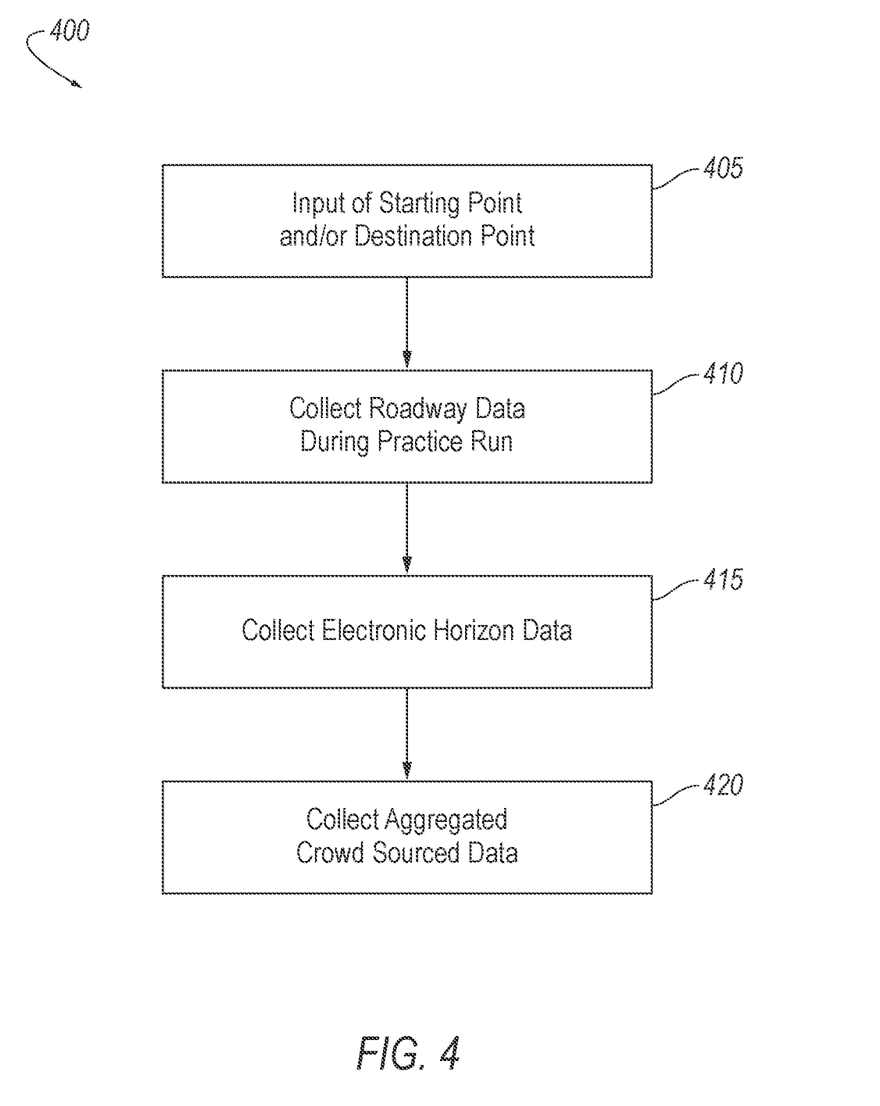
FIG. 4 is a block diagram showing an example of a portion of the process flow of FIG. 3 in greater detail.

FIG. 4 is a block diagram of a process flow 400, which may be representative of operations executed in various implementations of the system to perform block 310 of FIG. 3. Process flow 400 is an example method performed by an implementation of the system 100.

With reference to block 405, the process flow 400 includes input of a starting point 150 and/or a destination point 155 as roadway data. As an example, the starting point 150 and/or destination point 155 may be manually entered by the human driver. For example, the human driver may select a map location, map coordinates, landmarks saved in a map, etc. This selection by the human driver may be input to the system 100 through, for example, a human-machine interface including a touch screen. The system 100 may automatically choose or suggest a destination point 155 based on input of a starting point 150 or may automatically choose or suggest a starting point 150 based on input of a destination point 155.

With reference to block 410, the process flow 400 includes collection of roadway data during a practice run of the vehicle 105 from the starting point 150 to the destination point 155 prior to operation of the vehicle 105 in the minimum time mode. In other words, the human driver manually operates the vehicle systems to travel from the starting point to the destination point. During this travel from the starting point to the destination point, the vehicle 105, e.g., the sensors 115, collects roadway data. The collection of roadway data on such a practice run may be improved by aggressive or semi-aggressive operation of the vehicle 105 from the starting point 150 to the destination point 155. After manual operation of the vehicle 105 from the starting point 150 to the destination point 155, the human driver then returns the vehicle 105 to the starting point 150 for operation in the minimum time mode from the starting point 150 to the destination point 155.

In block 410, the roadway data may be collected by the sensors 115 of the vehicle 105. As an example, sensors 115 of the vehicle 105 may generate image data indicating changes in direction and/or elevation of the road surface, obstacles on the road surface, and/or other conditions of the road surface. As another example, sensors 115 of the vehicle may detect groundable torque of the vehicle 105, i.e., torque minus slippage on the road surface. This data may be used to calculate the coefficient of friction of the road surface at locations between the starting point 150 and the destination point 155, which can be used to determine the speed that the vehicle 105 should travel at locations on the minimum time path 160. As another example, sensors 115 may detect pitch and/or roll of the vehicle 105 at locations between the starting point 150 and the destination point 155, e.g., a sensor 115 such as an inertial measurement unit sensor. As another example, sensors 115 may detect weather, e.g., precipitation, visibility, etc., based on images from onboard cameras, automatic high beam sensors, etc.

With reference to block, 415, the process flow 500 includes collection of roadway data in the form of road-based data, e.g., electronic horizon data. The road-based data, e.g., electronic horizon data, is collected by the vehicle 115 as a combination of: data from the sensors 115 of the vehicle 105; one or more data providers/services; and/or stored map data indicating a current position or location of the vehicle 105. With the use of this road-based data, e.g., electronic horizon data, block 415 includes predicting a future trajectory of the vehicle 105 with respect to an upcoming portion of roadway conditions.

With reference to block 420, the process flow 400 includes collection of aggregated crowdsourced data collected from other vehicles and transmitted to the vehicle 105 by vehicle-to-vehicle communication and/or vehicle-to-infrastructure communication. As an example, the crowdsourced data may be of known types including that commercially known Road Experience Management (REM) from Mobileye. Specifically, the crowdsourced data may be data from the Mobileye Roadbook. In examples in which the process flow 400 collects aggregated crowdsourced data, the roadway data may be collected by other vehicles that have traveled a path or part of a path from the starting point to the destination point. The other vehicles may collect data with sensors similar to or the same as the sensors 115 of the vehicle 105.

In block 315, the process flow 300 includes determining the minimum time path 160 and speed. The minimum time path 160 and speed is a combination of locations of the vehicle 105 on a line from the starting point 150 to the destination point 155 and the speed of the vehicle 105 at those locations to minimize travel time from the starting point 150 to the destination point 155. Specifically, the minimum time path 160 is a line, straight and/or curved, extending continuously from the starting point 150 to the destination point 155. The corresponding speed is the calculated speed that the vehicle 105 should be traveling at any given point on the minimum time path 160 to accomplish to minimize travel time from the starting point 150 to the destination point 155. The minimum time path 160 in combination with the speed at the points along the minimum time path 160 are determined based on roadway conditions and operation of the vehicle systems to maximize torque transmission to the roadway, as described further below. For example, the minimum time path 160 and speed is calculated based on the performance characteristics of vehicle systems (e g., a braking system, a propulsion system, a steering system, a suspension system, etc.) and the systems' ability to operate in a way to maximize torque transmission from wheels of the vehicle 105 to the roadway based on the operation of the vehicle system in combination with roadway conditions such as condition of the roadway surface, curves in the road, changes in elevation, obstacles, etc. As described above, the minimum time path 160 may be used in competitive racing in which the lowest time from the starting point 150 to the destination point 155 is desirable.

The determination of the minimum time path 160 and speed is based on the roadway data collected before the initiation of the operation of the minimum time mode from the starting point 150. The system 100 may recalculate the minimum time path 160 and speed based on data collected during the operation of the minimum time mode between the starting point 150 and the destination point 155 based on vehicle performance feedback from data collected the sensors 115 and/or based on deviation of the vehicle 105 from the minimum time path 160 and/or speed. The determination of the minimum time path 160 and speed prior to operation of the minimum time mode from the starting point 150, and potential recalculation of the minimum time path 160 between the starting point 150 and the destination point 155, may be calculated using one or a combination of algorithms, computations, and lookup tables. The minimum time path 160 and speed may be a product of a calculation with an infinite set of locations and corresponding speeds between the starting point 150 and the destination point 155 or may be a discrete set of locations and corresponding speeds between the starting point 150 and the destination point 155.

With reference to block 320, the process flow 300 may include a requirement that the vehicle 105 is stopped at the starting point 150 before initiating operation of the minimum time mode. As another example, in the alternative to requiring standstill at the starting point 150, the process flow 300 may include initiating operation of the minimum time mode based on location of the vehicle 105 at the starting point 150, i.e., at a standstill or as the vehicle 105 moves across the starting point 150.

The process flow 300 may require input from the human driver as a prerequisite for initiation of operation in minimum time mode after enablement of the minimum time mode in block 405. For example, with reference to block 325, a maximum acceleration input may trigger initiation of the vehicle 105 into minimum time mode and operation of the vehicle 105 in minimum time mode. Maximum acceleration input may include, for example, full depression of an acceleration pedal of the vehicle. In addition, as an example, the maximum acceleration input may also include simultaneous depression of the brake pedal and full release of the brake pedal while maintaining full depression of the acceleration petal. In the alternative to a maximum acceleration input, another example of input from the human driver as a prerequisite for initiation of operation of the vehicle in minimum time mode may be input from the human driver to a human-machine interface such as a lever, pushbutton, etc. The maximum acceleration input or other input for initiation of operation of the vehicle in minimum time mode may operate the vehicle 105 at high acceleration at the starting point 150 and high speed between the starting point 150 and the destination point 155. As described further below, the system 100 provides instruction for operation of the vehicle 105 at this high acceleration and high speed between the starting point 150 and the destination point 155 to pursue the minimum time path.

With reference to block 330, the process flow 300 includes determining whether the vehicle is on the minimum time path 160 and at the corresponding speed between the starting point and the destination point after initiation of the minimum time mode. The determination that the vehicle 105 is on the minimum time path 160 and the corresponding speed may be based on data from the vehicle sensors 115. For example, the determination of whether the vehicle 105 is on the minimum time path 160 may be based on GPS location (e.g., collected by a GPS unit of the vehicle 105), image data from onboard camera, a combination thereof, etc. Similarly, the determination of whether the vehicle 105 is at the speed corresponding to the location on the minimum time path 160 may be based on GPS location, image data from onboard camera, a combination thereof, etc.

With reference to block 335, the process flow 300 includes, in the minimum time mode, instructing operation of at least one vehicle system for travel of the vehicle 105 from the starting point 150 to the destination point 155. After departing the starting point 150 in the direction of the destination point 155, instruction for operation of the vehicle 105 is provided until the vehicle 105 reaches the destination point 155 or until minimum time mode is terminated. As described further below, the instruction for operation of the vehicle 105 may include providing input to the human driver of the vehicle 105 so that the human driver can manually adjust operation of at least one vehicle system, and/or instruction for operation of the vehicle 105 may include operation instruction to at least one vehicle system for automated adjustment of operation of at least one vehicle system.

Instructing operation of at least one vehicle system for travel of the vehicle 105 from the starting point 150 to the destination point 155 is based at least in part on data from the sensors 115 of the vehicle 105. Specifically, the system 100 compares the measured location and speed of the vehicle 105 with the calculated minimum time path 160 and speed. Block 435 includes instructing at least one vehicle system of the vehicle 105 and/or the human driver for the following operation of the vehicle 105. If the vehicle 105 is on the minimum time path 160 and at the corresponding speed, then block 335 includes instructing at least one vehicle system to operate to maintain the adherence to the minimum time path 160 and speed and/or includes providing operation instruction to the human driver to maintain adherence to the minimum time path 160 and speed. If the location and/or speed of the vehicle 105 deviates from the calculated minimum time path 160 and/or corresponding speed, then block 335 includes instructing at least one vehicle system to operate to pursue a location on the minimum time path 160 and/or the corresponding speed.

The instruction of operation of at least one vehicle system in block 335 may include instruction to the human driver to be executed manually by the human driver and/or instruction to be the vehicle system to be executed automatically by the vehicle 105.

For example, block 335 may include providing instruction to the human driver to operate at least one of the vehicle system. The instruction of operation of at least one vehicle system in the minimum time mode and speed includes generating one or more prompts for driver input to a least one of the vehicle systems. For example, the instruction to the human driver may include visual, audible, and/or haptic instruction. As an example, the instruction may be provided to the human driver as a visual indicator, i.e., text, shapes, etc., presented to the driver on a heads-up display. As another example, the instruction may be provided to the human driver as spoken instructions presented through speakers in the vehicle 105.

In the addition or in the alternative to the instructions to the human driver for manual execution by the human driver, the system 100 may provide driver-assist control commands to the at least one vehicle system. The driver-assist control commands automatically assist the driver in operating the vehicle 105, and specifically assists the driver in operating the vehicle 105 in accordance with the process flow 300. The driver-assist control command to the vehicle system automatically controls that vehicle system without input from the human driver and in accordance with the process flow 300. For example, the system 100 may provide driver-assist control commands to an ECU 112 and/or actuator 120 of the steering system to control components 125 of the steering system to steer the vehicle 105, to an ECU 112 and/or actuator 120 of the propulsion system to control components 125 of the propulsion system to increase or decrease propulsion, to an ECU 112 and/or actuator 120 of the braking system to control components 125 of the braking system to brake, and/or to an ECU 112 and/or actuator 120 of the suspension system to control components 125 of the suspension system to actively or semi-actively control dampening characteristics of the suspension system.

In the event that block 335 includes providing driver-assist control command to one or more of the vehicle systems, a manual input to that vehicle system by the human driver may override the driver-assist control command. Specifically, the memory stores instructions executable by the processor detect a driver-input control command to the at least one vehicle system. As described above, the driver-input control command is a command provide by the human driver to the vehicle system to manually operate the vehicle system. Examples of driver-input control commands include human input to the propulsion system, braking system, steering system, etc. In the event the human driver provides driver-input control commands to the vehicle system, the driver-input control command may override the driver-assist control command from the system 100 to that vehicle system. In other words, in the event the human driver provides driver-input control commands to the vehicle system, operation of that vehicle system may be controlled according to the driver-input control commands provided by the human driver to that vehicle system. In such examples, if the human driver ceases providing driver-input control commands to that vehicle system, operation of that system according to the driver-assist control may resume. In some examples, in the event that driver-input control commands exceed predetermined threshold limits, the minimum time mode may be terminated, as described above. Specifically, the predetermined threshold limits may be based on predetermined parameters of vehicle operation, e.g., braking frequency and/or magnitude input from the human driver to the braking system, operation of the propulsion system and/or braking system that brings movement of the vehicle below a speed threshold, deviation of vehicle position relative to the minimum time path 160 beyond a threshold, etc.

Figure 5:
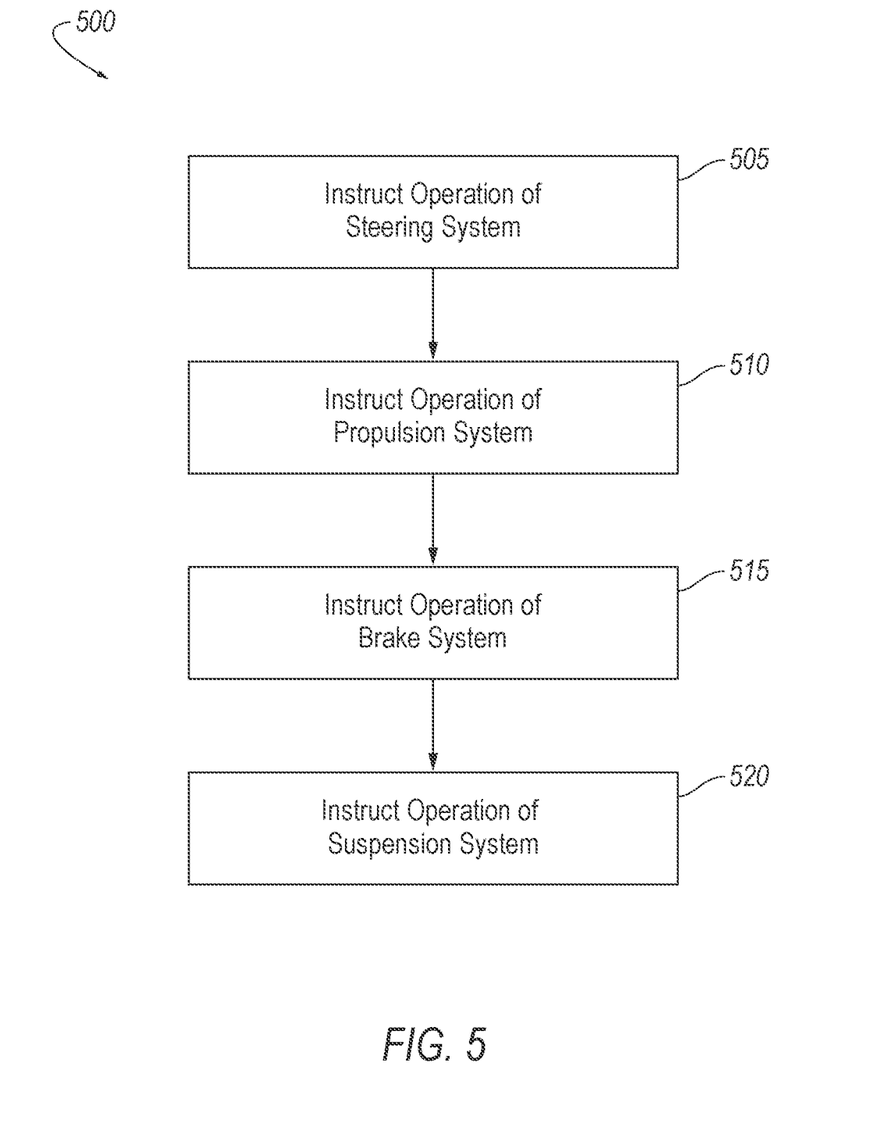
FIG. 5 is a block diagram showing an example of a portion of the process flow of FIG. 3 in greater detail.

FIG. 5 is a block diagram of a process flow 500, which may be representative of operations executed in various implementations of the system to perform block 335 of FIG. 3. Process flow 500 is an example method performed by an implementation of the system 100.

With reference to block 505, the process flow 500 includes instructing operation of the steering system to maintain and/or pursue the minimum time path 160 and speed. For example, block 505 may include providing prompts to the human driver, e.g., visual, audible, haptic, instructing the human driver to operate the steering system to maintain and/or pursue the minimum time path 160 and speed. The prompts to the human driver may instruct the human driver when to rotate the steering wheel and the steering angle of the steering wheel. In addition or in the alternative to the prompts to the human driver, block 505 may include providing driver-assist control commands to the steering system to automatically steer the vehicle 105.

With reference to block 510, the process flow 500 includes instructing operation of the propulsion system to maintain and/or pursue the minimum time path 160 and speed. For example, block 510 may include providing prompts to the human driver, e.g., visual, audible, haptic, instructing the human driver to operate the propulsion system to maintain and/or pursue the minimum time path 160 and speed. The prompts to the human driver may instruct the human driver when to depress or release depression of an accelerator pedal and the depressed position of the accelerator pedal. In addition or in the alternative to the prompts to the human driver, block 510 may include providing driver-assist control commands to the propulsion system to automatically increase or decrease power provided to the wheels of the vehicle 105.

With reference to block 515, the process flow 500 includes instructing operation of the braking system to maintain and/or pursue the minimum time path 160 and speed. For example, block 515 may include providing prompts to the human driver, e.g., visual, audible, haptic, instructing the human driver to operate the braking system to maintain and/or pursue the minimum time path 160 and speed. The prompts to the human driver may instruct the human driver when to depress or release depression of a brake pedal and the depressed position of the brake pedal. In addition or in the alternative to the prompts to the human driver, block 515 may include providing driver-assist control commands to the propulsion system to automatically control operation of brakes of the vehicle (e.g. movement of brake calipers, brake shoes, etc.)

With reference to block 520, the process flow 500 includes instructing operation of the suspension system to maintain and/or pursue the minimum time path 160 and speed. For example, block 520 may include providing driver-assist control commands to the suspension system to automatically control operation active and/or semi-active dampeners of the suspension system.

With reference to block 340, the process flow 300 continues to monitor the location and the speed of the vehicle relative to the minimum time path 160 and speed until the vehicle reaches the destination point. As another example, as set forth above, the human driver may manually terminate the minimum time mode and/or the system 100 may terminate the minimum time mode in response to deviation from the minimum time path 160 and/or speed, e.g., based on driver-input control commands to one or more of the vehicle systems that exceed a predetermined threshold limit, as described above.

Use of in response to, based on, and upon determining herein indicates a causal relationship, not merely a temporal relationship. With regard to the media, processes, systems, methods, etc. described herein, although steps have been described as occurring according to a certain ordered sequence, unless indicated otherwise or clear from context, such steps could be performed in an order other than the order described herein. Certain steps could be performed simultaneously, other intermediate steps may be added, or that some steps described herein could be omitted without departing from the nature of the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a computer having a processor and a memory, the memory storing instructions executable by the processor to:
instruct operation of at least one vehicle system of a vehicle for travel of the vehicle from a starting point to a destination point in a minimum time mode;
collect roadway data for a roadway from the starting point to the destination point;
based on the roadway data, determine a minimum time path and speed from the starting point to the destination point and optimal speed along the minimum time path; and
in response to a maximum acceleration input from a human driver when the vehicle is at the starting point, initiate the minimum time mode and instruct operation of at least one vehicle system to pursue the minimum time path and speed along the minimum time path from the starting point to the destination point in the minimum time mode.

2. The system of claim 1, wherein the memory stores instructions executable by the processor to require that the vehicle is stopped at the starting point to initiate the minimum time mode.

3. The system of claim 1, wherein the instruction of operation of at least one vehicle system in the minimum time mode includes providing driver-assist control commands to the at least one vehicle system.

4. The system of claim 3, wherein the memory stores instructions executable by the processor to detect a driver-input control command to the at least one vehicle system and to override driver-assist control commands to the at least one vehicle system based on the driver-input control command.

5. The system of claim 1, wherein the instruction of operation of at least one vehicle system in the minimum time mode includes generating a prompt for driver input to the human driver.

6. The system of claim 1, wherein roadway data for the roadway from the starting point to the destination point includes vehicle-collected data collected by the vehicle during a previous travel of the roadway by the vehicle from the starting point to the destination point.

7. The system of claim 1, wherein roadway data for the roadway from the starting point to the destination point includes data from a road-based data map.

8. The system of claim 1, wherein roadway data for the roadway from the starting point to the destination point includes captured image data generated by an onboard camera of the vehicle.

9. The system of claim 1, wherein the roadway data for the roadway from the starting point to the destination point includes data from an onboard camera, radar system, and/or lidar system.

10. The system of claim 1, wherein the instruction of operation of at least one vehicle system in the minimum time mode is based on feedback from an inertial measurement unit sensor during travel of the vehicle between the starting point and the destination point in the minimum time mode.

11. The system of claim 1, wherein instructing operation of at least one vehicle system includes instructing a steering system, a powertrain system, a braking system, and/or a suspension system.

12. A method comprising:
    instructing operation of at least one vehicle system of a vehicle for travel of the vehicle from a starting point to a destination point in a minimum time mode;
    collecting roadway data for a roadway from the starting point to the destination point;
    based on the roadway data, determining a minimum time path and speed from the starting point to the destination point and optimal speed along the minimum time path; and
    in response to a maximum acceleration input from a human driver when the vehicle is at the starting point, initiating the minimum time mode and instruct operation of at least one vehicle system to pursue the minimum time path and speed along the minimum time path from the starting point to the destination point in the minimum time mode.

13. The method of claim 12, wherein instructing operation of at least one vehicle system in the minimum time mode includes providing driver-assist control commands to the at least one vehicle system.

14. The method of claim 12, wherein instructing operation of at least one vehicle system in the minimum time mode includes generating a prompt for driver input to the human driver.

15. The method of claim 12, wherein roadway data for the roadway from the starting point to the destination point includes data from a road-based data map.

16. The method of claim 12, wherein roadway data for the roadway from the starting point to the destination point includes captured image data generated by an onboard camera of the vehicle.

17. The system of claim 12, wherein the roadway data for the roadway from the starting point to the destination point includes data from an onboard camera, radar system, and/or lidar system.

18. The method of claim 12, wherein instructing operation of at least one vehicle system in the minimum time mode is based on feedback from an inertial measurement unit sensor during travel of the vehicle between the starting point and the destination point in the minimum time mode.

19. The method of claim 12, wherein instructing operation of at least one vehicle system includes instructing a steering system, a powertrain system, a braking system, and/or a suspension system.

* * * * *